April 25, 1967

N. J. POULIN 3,315,409

GREENHOUSE

Filed Oct. 27, 1965

INVENTOR.
*Noe J. Poulin*
BY
*Roberts, Cushman & Grover*
ATT'YS

April 25, 1967     N. J. POULIN     3,315,409
GREENHOUSE
Filed Oct. 27, 1965     2 Sheets-Sheet 2
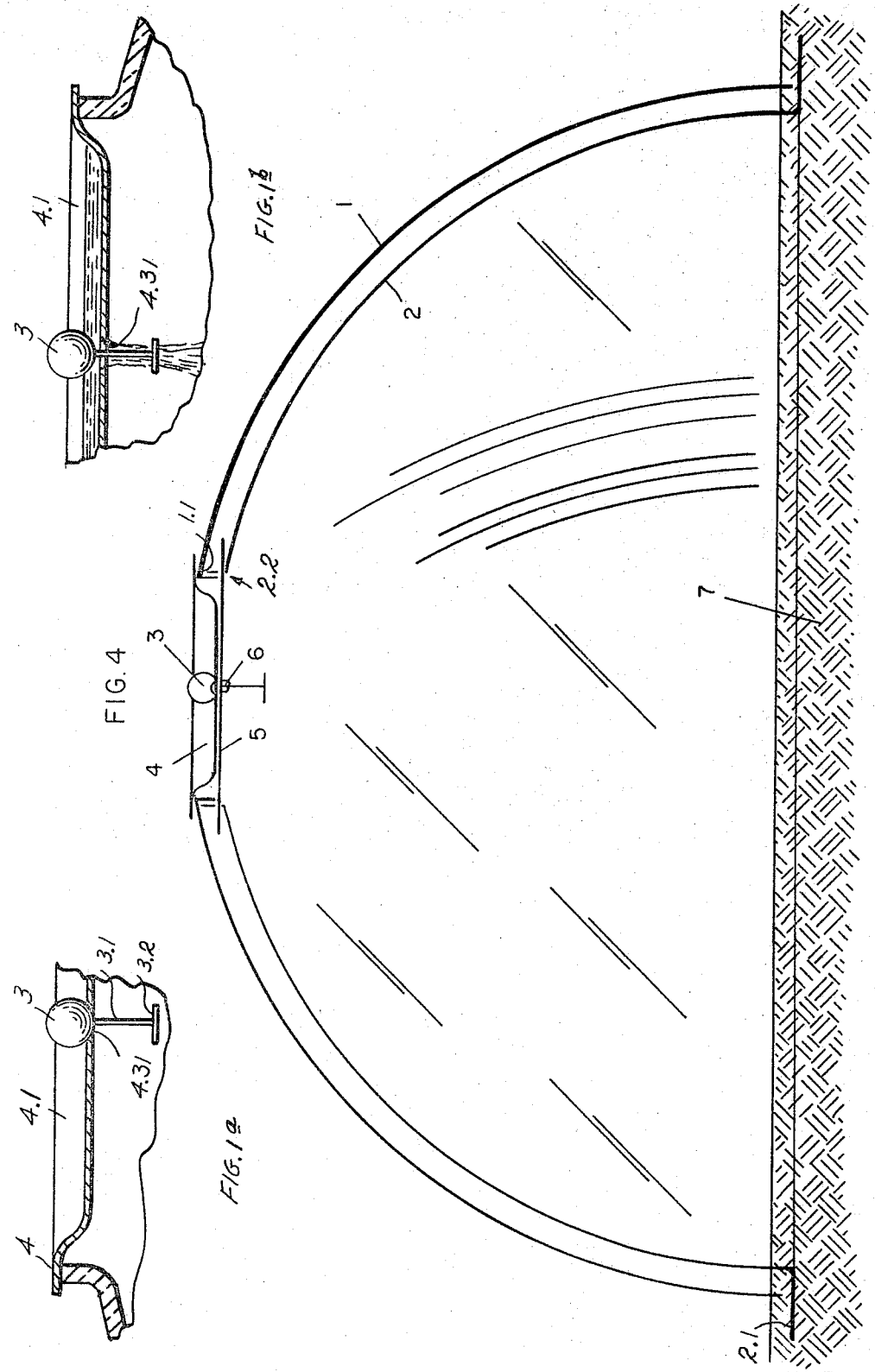

United States Patent Office 3,315,409
Patented Apr. 25, 1967

3,315,409
GREENHOUSE
Noe J. Poulin, Box 41, Quinebaug, Conn. 06262
Filed Oct. 27, 1965, Ser. No. 505,328
8 Claims. (Cl. 47—17)

The field of this invention relates to greenhouses, and more particularly to small easily transportable greenhouses adapted to nurture young plants in their natural environment while protecting them from detrimental features of such environment.

Various greenhouses of this type have been suggested but are unsatisfactory in several respects. In use, they require constant surveillance and regulation to provide a favorable environment. The plants therein must be watered frequently, because rainfall cannot reach them. Usually, watering ports are provided, but warmth and moisture can then escape. During warm or sunny days, the temperature inside the greenhouse rises greatly and it is necessary to provide ventilation to prevent damage to the plants. With the return of night, or when cooler weather prevails, the ventilators must be closed to retain heat within the greenhouse. Occasionally, greenhouses have been provided with means to automatically regulate ventilation, but these means have required relatively intricate and expensive apparatus.

Objects of the present invention are to provide a greenhouse of this general type which automatically regulates ventilation, which utilizes rainfall to provide moisture, which automatically retains moisture admitted by watering or rainfall, which can be easily transported out into operation and disassembled without tools, and which is not only inexpensively constructed, but also durable and versatile.

The substance of the invention can be shortly summarized as involving a light-admitting housing with a top opening and slots at opposite sides of the opening and with a cover extending over the opening, the inside of the cover contacting and preferably being fastened to a bimetal strip freely extending into the slots. The bimetal strip will buckle upon temperature rise and open the cover. In another aspect of the invention, the cover is dished and has one or more perforations in its bottom, and float valve means for closing the perforations are provided, preferably with guide means in the perforations. The cover is thus capable of accumulating rain water which is admitted by the float valve upon reaching some height. At the same time, moisture is retained within the housing by the valve means.

These and other objects and aspects of the novel substance of the invention will be apparent from the following description of a typical embodiment by way of illustration.

The description refers to drawings in which:

FIG. 1a is a partial cross-sectional view on 1a of FIG. 1 of the upper portion of the greenhouse showing a float valve in closed position;

FIG. 1b is a similar view on 1b of FIG. 1 showing a float valve in open position;

FIG. 4 is an essentially diagrammatic cross-sectional view of the greenhouse in use.

In this embodiment of the invention, the greenhouse has a light-admitting housing comprising a semispherical outer shell 1 and a concentric semispehrical inner shell 2. Each shell is vacuum-molded from a light-admitting plastic, such as Glassite, and an air space is provided between the concentric shells on assembly, to insulate the interior of the greenhouse from rapid heat loss.

Figure 5:
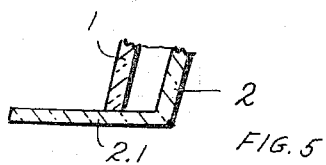
FIG. 5 is a partial cross-sectional view of the lower portion of the greenhouse.

An outwardly extending rim 2.1 is formed integral with the inner shell 2 at the bottom periphery thereof (FIGS. 4 and 5). This rim is optional but preferred because, when loaded with soil, it serves to anchor the greenhouse in place and to prevent it from being blown over by wind. As shown in FIG. 5, the bottom edge of the outer shell 1 abuts the upper surface of the rim 2.1.

In the top of the flat apex of the inner shell 2, a circular opening 2.2 is provided. An upwardly extending wall portion in the form of a lip 2.3 is formed integral with the inner shell 2 at the periphery of this top opening, and this lip has diametrically opposite approximately rectangular slots 2.4, 2.5.

In the top of outer shell 1, a circular hole 1.1 is provided to receive the lip 2.3.

Figure 1:
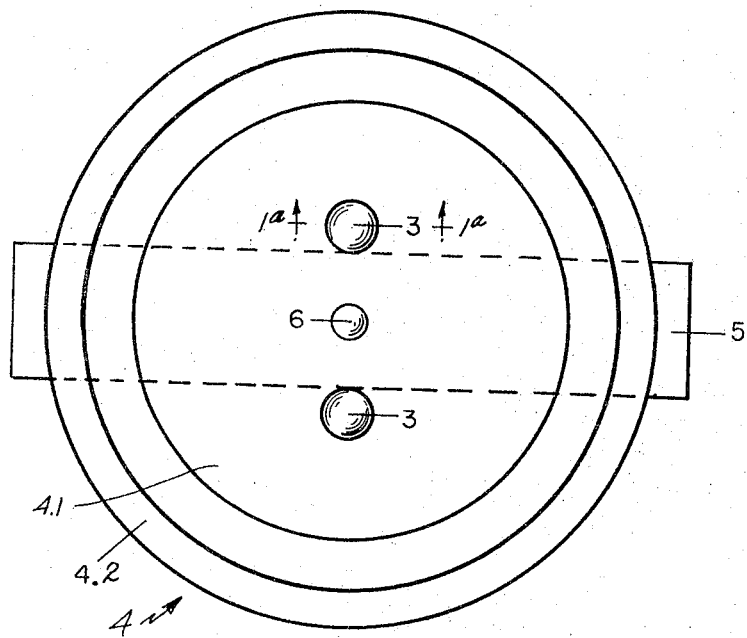
FIG. 1 is a plan view of the transparent cover with bimetal strip and float valve means.

A cover 4 having a dished portion 4.1 extends with its rim 4.2 beyond the lip 2.3, capable of freely resting thereon. The cover is made similarly to the housing, that is, it is vacuum-molded from a light-admitting plastic. In the dished portion, the cover is provided with one or more circular perforations 4.31 (FIGS. 1a and 1b). In the dished portion are located spherical float valves 3 for closing the perforations, made from styrofoam or another highly buoyant material. As shown in FIG. 1a, a float valve will plug its perforation when no water is in the dished portion 4.1, and thereby prevent escape of moisture and heat from the greenhouse. When water is deposited by rain or watering in the dished portion of the cover, it will be admitted into the interior of the greenhouse when the water level rises sufficiently to buoy the float valve as shown in FIG. 1b. To guide the float valve back to its perforation as the water recedes, guide pins 3.1 extending through the perforations are attached to the float valve balls. The guide pin 3.1 is provided with a cross-piece 3.2 to prevent the float valve from being blown away or becoming accidentally lost.

Figure 2:
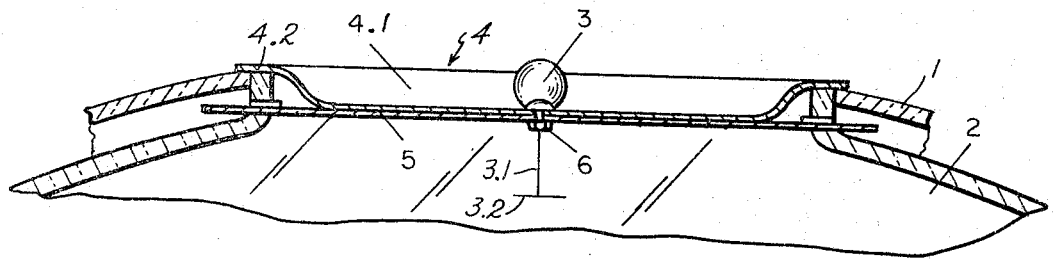
FIG. 2 is a cross-section of the upper portion of the greenhouse, showing the cover and valve in closed position.
Figure 3:
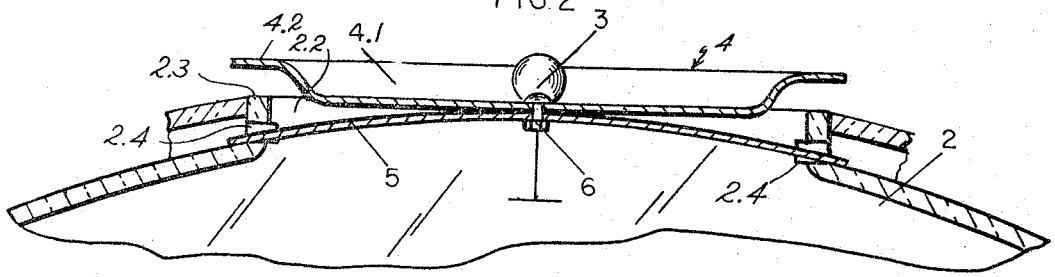
FIG. 3 is a view similar to FIG. 2 with the cover in open position.

A bimetal strip 5 loosely fits with its ends into the slots 2.4, 2.5 in the lip 2.3 and is at the intermediate region fastened by rivet means 6 to the cover 4 near its center. This bimetal strip is oriented so that when the temperature inside the housing rises beyond a predetermined degree, the strip is distorted and for example bows upwardly and raises the cover 4 from the lip 2.3, thereby permitting heat to escape through the opening 2.2 (FIG. 3). When the temperature in the interior of the housing is sufficiently reduced by ventilation, the bimetal strip 5 straightens, and lowers the cover 4 until it again rests against the lip 2.3, so that warmth and moisture will be retained within the greenhouse (FIG. 2). As the cover 4 is lowered by the action of the bimetal strip, the dished portion of the cover acts as a guide to center the cover in the opening 2.2.

Should it be necessary to have access to the plants in the greenhouse, the cover 4 may be removed by moving it laterally until one end of the bimetal strip 5 is withdrawn from slot 2.4 or 2.5, by tilting the cover until this free end is above the lip 2.3, and moving the cover laterally in the opposite direction until the other end of the bimetal strip is withdrawn from the other slot.

If desired, the housing can be used either with or without the outer shell 1. The outer shell may be removed simply by withdrawing the bimetal strip from the slots 2.4, as described above, lifting off the cover 4, and then lifting off the outer shell 1. Needless to say, this versatility reduces the construction costs of the greenhouse, because both single and double walled models can be uilt using the same parts. Moreover, users of the reenhouse can easily adapt it from single or double alled construction by adding the optional outer shell, nd they may replace worn or damaged parts individually nd inexpensively. It will be noted that assembly and daptation can be carried out on location without any ools, once cover, bimetal strip, and float valves have een assembled at the factory.

It should be understood that the present disclosure is or the purpose of illustration only and that this invention ncludes all modifications and equivalents which fall within the scope of the appended claims.

I claim:
1. A greenhouse comprising:
   a light-admitting housing having a flat apex with an opening having a rim formed by a wall portion of the housing, and having opposite slots in said wall portion;
   a cover for said opening capable of resting freely on said rim; and
   a bimetal strip extending with its ends into respective slots, at its intermediate region centrally contacting said cover, and oriented uniformly to lift said cover from the opening upon distortion of the strip by temperature rise.

2. A greenhouse according to claim 1 wherein said housing is semispherical and said rim has a cylindrical lip, and wherein said cover extends beyond said lip.

3. Greenhouse according to claim 1 wherein said cover is upwardly dished and has at least one perforation in its lower portion, and which further comprises float valve means on said lower portion for closing said perforation for retaining moisture within the housing when the cover is empty and for opening it to admit water when the cover is filled sufficiently to float the valve.

4. Greenhouse according to claim 3 wherein said float valve means have guide means extending into said perforation for retaining the valve means in position on the perforation as the water in the cover recedes.

5. Greenhouse according to claim 1 wherein said cover has an upwardly dished portion and two perforations one on each side of said intermediate region of the bimetal strip, and further comprising two buoyant spherical floats larger than the perforations, one for each perforation and each having a guide pin reaching into its perforation and a cross piece inside of and larger than the perforation, for retaining the float at its perforation for opening and closing it dependent on the amount of water in the dished portion.

6. Greenhouse according to claim 1 further comprising a second transparent housing separably surrounding said first housing and having an opening closely engaging said wall portion above said slots.

7. Greenhouse according to claim 6 wherein said first housing has a bottom rim extending beyond the bottom edge of said second housing when placed on the rim.

8. Greenhouse according to claim 6 said cover reaches over wherein said opening of the second housing.

References Cited by the Examiner

UNITED STATES PATENTS

| | | | |
|---|---|---|---|
| 585,009 | 6/1897 | Taylor et al. | 47—28 X |
| 757,045 | 4/1904 | Lane | 47—27 X |
| 1,907,145 | 5/1933 | Broman. | |

FOREIGN PATENTS 477,706  1/1938  Great Britain.

ABRAHAM G. STONE, *Primary Examiner.*

P. A. RAZZANO, *Assistant Examiner.*